United States Patent
Wiles

(10) Patent No.: US 6,869,257 B2
(45) Date of Patent: Mar. 22, 2005

(54) METHOD FOR DEBURRING AND TOOL FOR USE THEREIN

(75) Inventor: Kenneth G. Wiles, Bay City, MI (US)

(73) Assignee: Means Industries, Inc., Saginaw, MI (US)

( * ) Notice: Subject to any disclaimer, the term of this patent is extended or adjusted under 35 U.S.C. 154(b) by 169 days.

(21) Appl. No.: 10/304,814

(22) Filed: Nov. 26, 2002

(65) Prior Publication Data

US 2004/0101378 A1 May 27, 2004

(51) Int. Cl.⁷ .............................................. B23B 51/00
(52) U.S. Cl. .................. 408/54; 408/154; 408/187; 82/1.5
(58) Field of Search ................... 408/1 R, 54, 93, 408/154, 155, 156, 187, 188, 211, 227, 708; 82/1.5

(56) References Cited

U.S. PATENT DOCUMENTS

| | | | | |
|---|---|---|---|---|
| 2,314,084 A | * | 3/1943 | Fried | 408/147 |
| 2,394,612 A | * | 2/1946 | Horne, Jr. | 82/1.5 |
| 2,620,689 A | * | 12/1952 | Cogsdill | 82/1.5 |
| 2,895,356 A | * | 7/1959 | Cogsdill | 408/200 |
| 3,318,175 A | | 5/1967 | Cogsdill | |
| 3,940,214 A | * | 2/1976 | Waschek | 408/26 |
| 4,589,805 A | * | 5/1986 | Duffner | 408/21 |
| 4,599,020 A | | 7/1986 | Colburn | |
| 4,710,070 A | | 12/1987 | Alsen et al. | |
| 5,135,338 A | | 8/1992 | Heule | |
| 5,137,397 A | | 8/1992 | Koketsu | |
| 5,181,810 A | * | 1/1993 | Heule | 408/147 |
| 5,209,617 A | | 5/1993 | Heule | |
| 5,297,905 A | | 3/1994 | Schmidt et al. | |
| 5,358,363 A | | 10/1994 | Robinson | |
| 5,507,606 A | | 4/1996 | Steiner | |
| 5,716,171 A | * | 2/1998 | Malott et al. | 408/187 |
| 5,755,538 A | | 5/1998 | Heule | |
| 5,803,679 A | | 9/1998 | Heule | |
| 6,217,457 B1 | * | 4/2001 | Waytone et al. | 464/168 |

FOREIGN PATENT DOCUMENTS

DE 3727103 * 2/1989 .......... B23B/51/10

* cited by examiner

*Primary Examiner*—Daniel W. Howell
(74) *Attorney, Agent, or Firm*—Brooks Kushman P.C.

(57) ABSTRACT

A method for deburring and tool for use therein wherein workpiece-engaging portions of a cutter of the tool prevent the cutting of chamfers to hole edges of boreholes. The tool removes burrs from a drilling operation performed on a steering yoke. The yoke includes two boreholes on parallel legs that are drilled in line with one another. The boreholes must be burr-free with little or no chamfer. The cutter is spring-urged or loaded to pivot on a cylindrical shaft to expose cutting edges of the cutter after a predetermined amount of angular movement from a substantially vertical position. The workpiece-engaging portions prevent the cutter from digging in and cutting the chamfers. The cutter rotates into retracted positions within the shaft to allow the cutter to pass through the drilled boreholes so that the cutting edges of the cutter can deburr surfaces of the yoke at both sides of each of the legs.

12 Claims, 3 Drawing Sheets

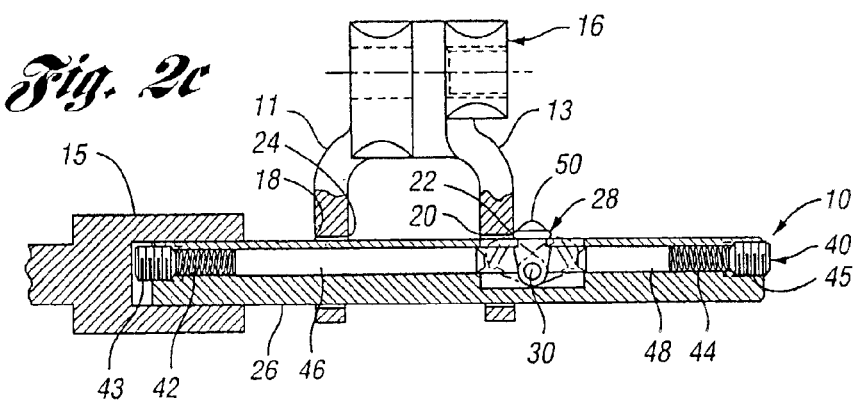
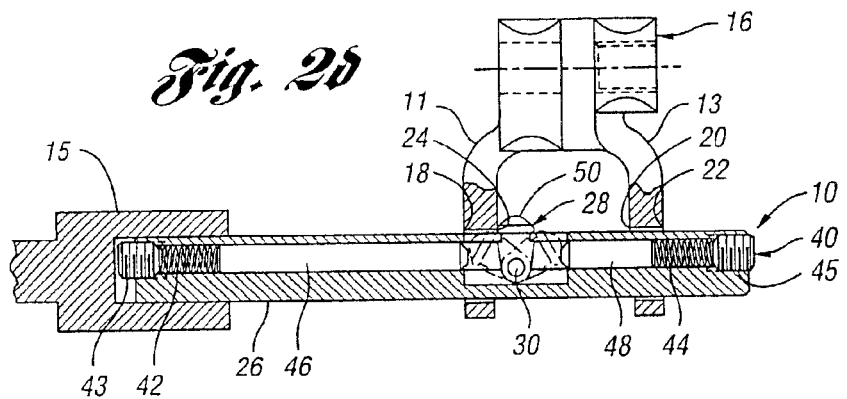
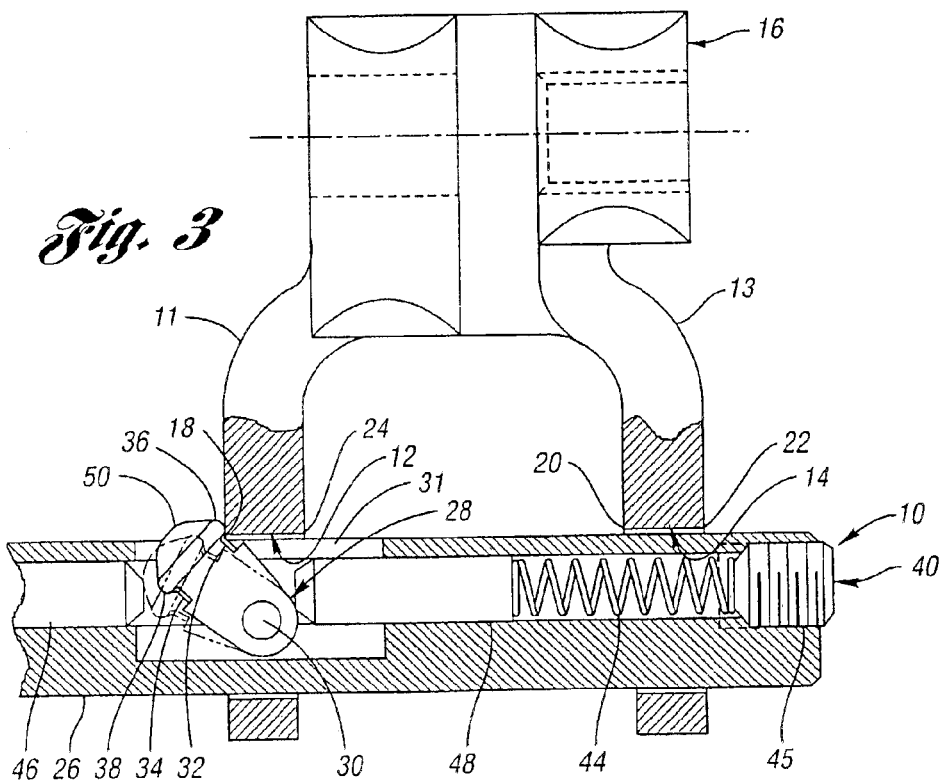

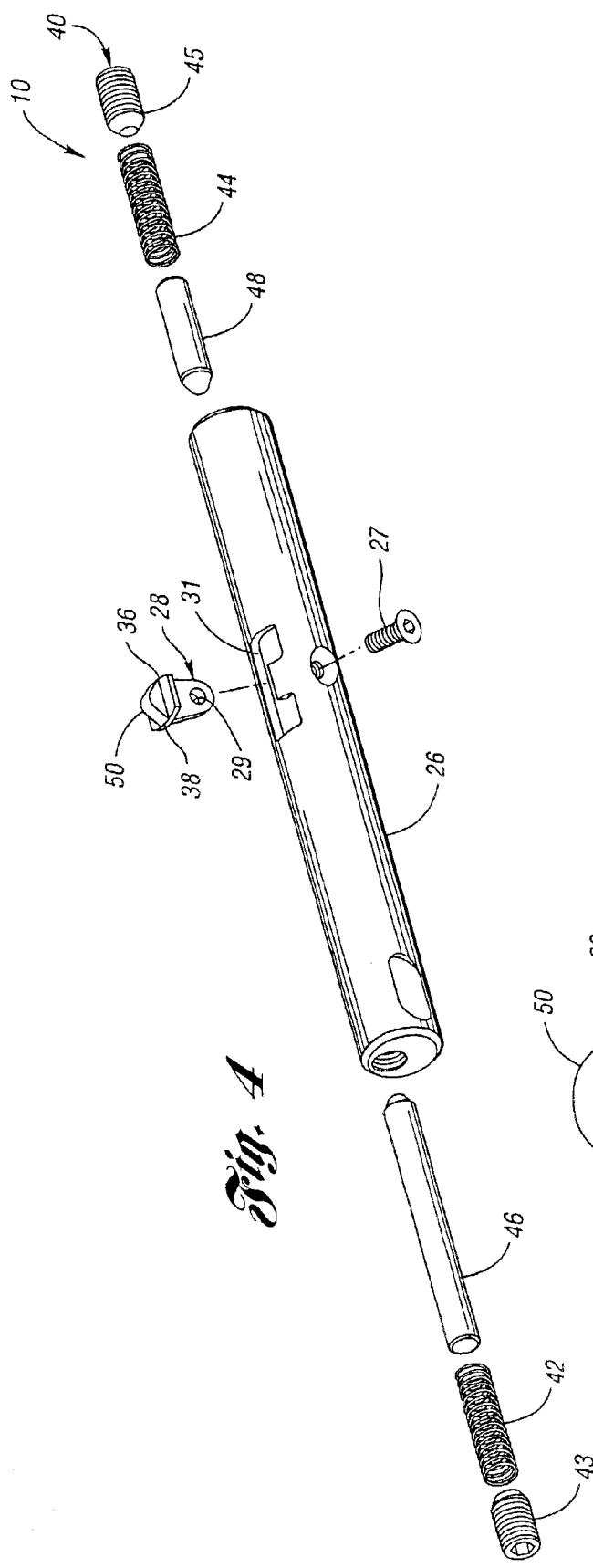

METHOD FOR DEBURRING AND TOOL FOR USE THEREIN

BACKGROUND OF THE INVENTION

1. Field of the Invention

This invention relates to a method for deburring and tool for use therein.

2. Background Art

Deburring tools are generally employed to deburr holes or passages bored through a workpiece and to put a chamfer on the edges of the hole in the workpiece at the opening of the passages. However, such chamfers are oftentimes not necessary and, even more importantly, undesirable in many manufacturing and/or assembly environments wherein little or no chamfer is required for subsequent operations.

U.S. Pat. Nos. 5,803,679; 5,755,538; 5,358,363; 5,297,905; 5,209,617; 5,135,338; and 4,599,020 disclose deburring tools including extensible cutting elements.

U.S. Pat. Nos. 3,318,175; 4,710,070; 5,137,397; and 5,507,606 are representative of so-called back-facing tools that are used for deburring the back surface of a workpiece.

SUMMARY OF THE INVENTION

An object of the present invention is to provide a method for deburring and tool for use therein wherein little or no chamfer to at least one hole edge of a borehole in a workpiece is present after a deburring operation.

In carrying out the above object and other objects of the present invention, a method for deburring a pair of aligned boreholes formed completely through a workpiece is provided. The method includes providing a workpiece having first and second aligned boreholes wherein each borehole has inside and outside hole edges. The method also includes shaving burrs and rough portions from the outside hole edge of the first borehole while preventing substantially any chamfer to the outside hole edge of the first borehole, shaving burrs and rough portions from the inside hole edge of the second borehole while preventing substantially any chamfer to the inside hole edge of the second borehole, shaving burrs and rough portions from the outside hole edge of the second borehole while preventing substantially any chamfer to the outside hole edge of the second borehole, and shaving burrs and rough portions from the inside hole edge of the first borehole while preventing substantially any chamfer to the inside hole edge of the first borehole. Burrs and rough portions are removed from the inside and outside hole edges of the first and second boreholes with little or no chamfer.

The workpiece may be a yolk such as a steering yolk.

Further in carrying out the above objects and other objects of the present invention, a tool for shaving burrs and rough portions from a hole edge of a borehole formed through a workpiece while preventing substantially any chamfer to the hole edge of the borehole is provided. The tool includes a shaft having a first axis and a cutter pivotally mounted on the shaft to rotate about a second axis substantially orthogonal to the first axis. The cutter has a cutting edge and a workpiece-engaging portion. The tool further includes a mechanism to spring-load the cutter so that the cutter is normally held in a substantially vertical position and the cutter controllably rotates about the second axis from the substantially vertical position in a first direction upon engagement of the workpiece-engaging portion with the workpiece during movement of the cutter along the first axis wherein the workpiece-engaging portion substantially prevents the cutting edge from chamfering the hole edge. During further movement of the cutter along the first axis in the borehole the cutter further controllably rotates about the second axis in the first direction to expose the cutting edge so that the cutting edge shaves burrs and rough portions from the hole edge of the borehole. During still further movement of the cutter along the first axis in the borehole, the cutter still further controllably rotates about the second axis in the first direction until the cutter rotates into a retracted position within the shaft.

The mechanism may include at least one spring within the shaft for spring-loading the cutter along the first axis.

The mechanism may further include at least one pin for engaging the cutter within the shaft wherein the at least one pin is spring-loaded by the at least one spring.

The cutter may include a head portion for engaging one end of the at least one pin in the retracted position.

Still further in carrying out the above objects and other objects of the present invention, a tool for shaving burrs and rough portions from first and second hole edges of a borehole formed completely through a workpiece between first and second surfaces thereof while preventing substantially any chamfer to the first and second hole edges of the borehole is provided. The tool includes a shaft having a first axis and a cutter pivotally mounted on the shaft to rotate about a second axis substantially orthogonal to the first axis. The cutter has first and second cutting edges and first and second workpiece-engaging portions. The tool further includes a mechanism to spring-load the cutter so that the cutter is normally held in a substantially vertical position and the cutter controllably rotates about the second axis from the substantially vertical position in a first direction upon engagement of the first workpiece-engaging portion with the first surface of the workpiece during movement of the cutter along the first axis wherein the first workpiece-engaging portion substantially prevents the first cutting edge from chamfering the first hole edge. During further movement of the cutter along the first axis in the borehole the cutter further controllably rotates about the second axis in the first direction to expose the first cutting edge so that the first cutting edge shaves burrs and rough portions from the first hole edge of the borehole. During still further movement of the cutter along the first axis in the borehole, the cutter still further controllably rotates about the second axis in the first direction until the cutter rotates into a first retracted position within the shaft to allow the cutter to completely pass through the borehole. The mechanism further spring-loads the cutter so that the cutter controllably rotates about the second axis from the substantially vertical position in a second direction opposite the first direction upon engagement of the second workpiece-engaging portion with the second surface of the workpiece during movement of the cutter along the first axis wherein the second workpiece-engaging portion substantially prevents the second cutting edge from chamfering the second hole edge. During further movement of the cutter along the first axis in the borehole the cutter further controllably rotates about the second axis in the second direction to expose the second cutting edge so that the second cutting edge shaves burrs and rough portions from the second hole edge of the borehole. During still further movement of the cutter along the first axis in the borehole, the cutter still further controllably rotates about the second axis in the second direction until the cutter rotates into a second retracted position within the shaft to allow the cutter to completely pass through the borehole again.

The mechanism may include first and second springs within the shaft for spring-loading the cutter in opposite direction along the first axis.

The mechanism may further include first and second pins for engaging the cutter within the shaft wherein the first and second pins are spring-loaded by the first and second springs, respectively.

The cutter may include a head portion for engaging an end of one of the pins in each of the retracted positions.

BRIEF DESCRIPTION OF THE DRAWINGS

FIGS. 2a–2d are side views, partially broken away and in cross-section, showing the steps of a method of the invention for deburring inside and outside hole edges of first and second aligned boreholes in the legs of the steering yoke;

FIG. 3 is an enlarged view, partially broken away and in cross section, with a cutter in a cutting position;

FIG. 4 is an exploded perspective view showing the various components of the deburring tool;

FIG. 5 is an enlarged side elevational view of the cutter;

FIG. 6 is a top plan view of the cutter of FIG. 5; and

FIG. 7 is a side elevational view of the cutter of FIG. 5 rotated 90°.

DETAILED DESCRIPTION OF THE PREFERRED EMBODIMENTS

Figure 1:
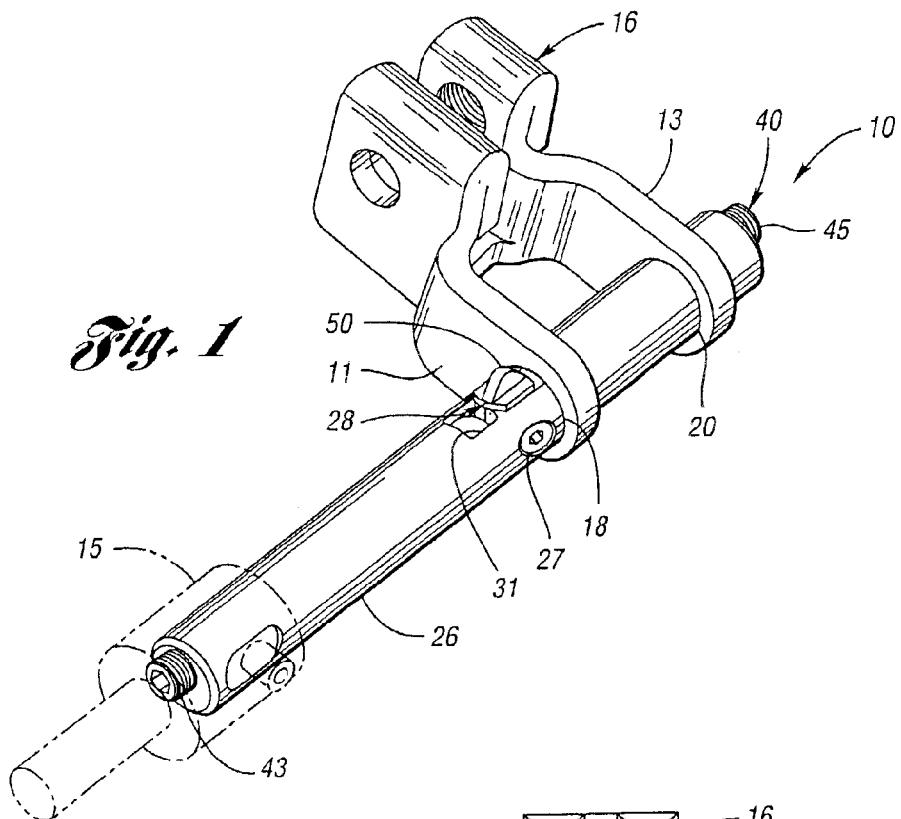
FIG. 1 is an environmental perspective view showing the deburring tool extending through aligned boreholes in the legs of a steering yoke and coupled to a driver such as a tap driver as shown by phantom lines.

Referring now to the drawing figures, there is shown, generally indicated at 10, a deburring tool constructed in accordance with the present invention. The tool 10 is capable of deburring a pair of aligned boreholes, generally indicated at 12 and 14 in FIG. 3, formed completely through legs 11 and 13, respectively, of a workpiece such as a steering yoke, generally indicated at 16, in accordance with a method of the present invention. The tool 10 is typically held in a driver 15 which rotatably drives the tool 10.

Figure 2A:
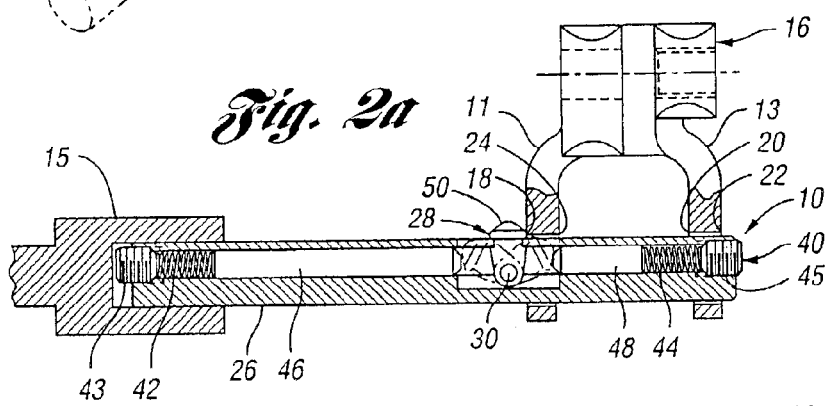
Figure 2B:
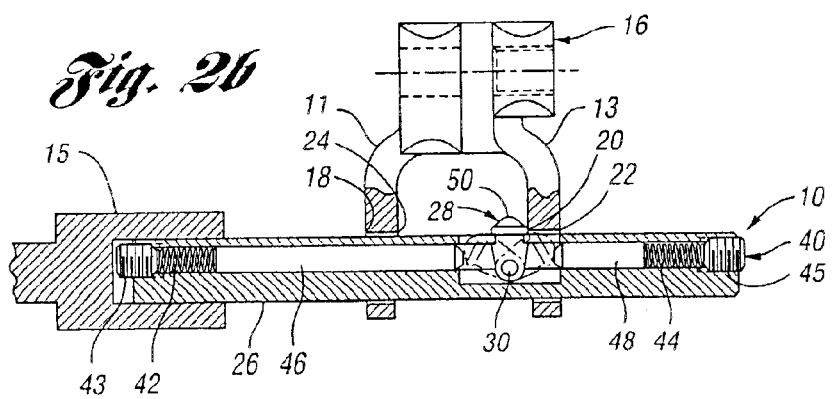

In general, the method includes shaving burrs and rough portions from an outside hole edge 18 of the first borehole 12 while preventing substantially any chamfer to the outside hole edge 18 of the first borehole 12, as shown in FIGS. 2a and 3. The method also includes shaving burrs and rough portions from an inside hole edge 20 of the second borehole 14 while preventing substantially any chamfer to the inside hole edge 20 of the second borehole 14, as shown in FIG. 2b. The method further includes shaving burrs and rough portions from an outside hole edge 22 of the second borehole 14 while preventing substantially any chamfer to the outside hole edge 22 of the second borehole 14, as shown in FIG. 2c. Finally, the method includes shaving burrs and rough portions from an inside hole edge 24 of the first borehole 12 while preventing substantially any chamfer to the inside hole edge 24 of the first borehole 12, as shown in FIG. 2d. Burrs and rough portions are removed from the inside hole edges 24 and 20 and the outside hole edges 18 and 22 of the first and second boreholes 12 and 14 with little or no chamfer.

The tool 10 includes a shaft 26 having a first axis and a cutter, generally indicated at 28, pivotally mounted on the shaft 26 by a threaded member 27 which extends through a hole 29 (i.e., FIG. 5) formed through the cutter 28 to rotate about a second axis 30 substantially orthogonal to the first axis within a slot 31 formed through the shaft 26. As best shown in FIGS. 3, 5, 6 and 7, the cutter 28 has first and second cutting edges 32 and 34 positioned beneath first and second workpiece-engaging portions 36 and 38 of the cutter 28.

The tool 10 also includes a mechanism, generally indicated at 40, to spring-load the cutter 28. The mechanism includes first and second springs 42 and 44 held by threaded members 43 and 45, respectively, within the shaft 26 for spring-loading the cutter 28 along the first axis.

The mechanism 40 further includes first and second pins 46 and 48 for engaging the cutter 28 within the shaft 26 at inner ends thereof. The first and second pins 46 and 48 are spring-loaded by the first and second springs 42 and 44, respectively, at outer ends thereof.

The cutter includes a head portion 50 for engaging the inner ends of the pins 46 and 48 in first and second retracted positions of the cutter 28 as shown by phantom lines in FIGS. 2a–2d.

FIGS. 5, 6 and 7 are enlarged side elevational, top plan and side elevational (rotated 90°) views, respectively, of the cutter 28 to show the details of the cutting edges 32 and 34.

Operation of Tool

Initially, the driver 15 rotatably drives the tool 10 and moves the tool 10 along its first axis (to the right as shown in the drawing figures). The mechanism 40 spring-loads the cutter 28 so that the cutter 28 is normally held in a substantially vertical position, as shown by the solid line positions of the cutter 28 in FIGS. 1 and 2a–2d.

As shown in FIG. 2a, the cutter 28 controllably rotates about the second axis 30 from the substantially vertical position in a first counterclockwise direction upon engagement of the first workpiece-engaging portion 36 with the leg 11 of the workpiece 10 during movement of the cutter 28 along the first axis. The first workpiece-engaging portion 36 substantially prevents the first cutting edge 32 from chamfering the first hole edge 18. During further movement of the cutter 28 along the first axis in the first borehole 12, the cutter 28 further controllably rotates about the second axis 30 in the first direction to expose the first cutting edge 32 so that the first cutting edge 32 shaves burrs and rough portions from the first hole edge 18 of the first borehole 12. Such deburring typically occurs when the cutter 28 has rotated through an angle of approximately 50° from its vertical position, as shown in FIG. 3. During still further movement of the cutter 28 along the first axis in the first borehole 12, the cutter 28 still further controllably rotates about the second axis 30 in the first direction until the cutter 28 rotates into a first retracted position (as shown in phantom in FIG. 2a) within the shaft 26 to allow the cutter 28 to completely pass through the first borehole 12. After completely passing through the first borehole 12, the mechanism 40 biases the cutter 28 back into its substantially vertical position.

As shown in FIG. 2b, in the like fashion, the cutter 28 and its first cutting edge 32 shaves burrs and rough portions from the inner hole edge 20 of the second borehole 14 after the first cutting edge 32 is exposed following rotation of the cutter 28 (after cutter rotation of approximately 50°) and after the first workpiece-engaging portion 36 substantially prevents the first cutting edge 32 from chamfering the inner hole edge 20. Then, the cutter 28 again rotates into its first retracted position within the shaft 26 to allow the cutter 28 to completely pass through the second borehole 14. After completely passing through the second borehole 14, the mechanism 40 biases the cutter 28 back into its substantially vertical position.

As shown in FIG. 2c, the mechanism 40 further spring-loads the cutter 28 so that the cutter 28 controllably rotates about the second axis 30 from the substantially vertical position in a second clockwise direction opposite the first direction upon engagement of the second workpiece-engaging portion 38 with the leg 13 of the workpiece 16 during movement of the cutter 28 back along the first axis (to the left as shown in FIG. 2c) wherein the second workpiece-engaging portion 38 substantially prevents the second cutting edge 34 from chamfering the outer hole edge 22. During further movement of the cutter 28 along the first axis in the second borehole 14, the cutter 28 further controllably rotates about the second axis 30 in the second direction to expose the second cutting edge 34 to shave burrs and rough portions from the outer hole edge 22 of the second borehole 14 (again at an angle of approximately 50° from vertical). During still further movement of the cutter 28 along the first axis in the second borehole 14, the cutter 28 still further controllably rotates about the second axis 30 in the second direction until the cutter 28 rotates into a second retracted position (as shown in phantom) within the shaft 26 to allow the cutter 28 to completely pass through the second borehole 14 again. After completely passing through the second borehole 14, the mechanism 40 biases the cutter 28 back into its substantially vertical position.

As shown in FIG. 2d, in like fashion, the cutter 28 and its second cutting edge 34 shaves burrs and rough portions from the inner hole edge 24 of the first borehole 12 after the second cutting edge 34 is exposed following rotation of the cutter 28 (again through an angle of approximately 50°) and after the second workpiece-engaging portion 38 substantially prevents the second cutting edge 34 from chamfering the inner hole edge 24. Then, the cutter 28 again rotates into its second retracted position within the shaft 26 to allow the cutter 28 to completely pass through the first borehole 12 again. After completely passing through the first borehole 12, the mechanism 40 biases the cutter 28 back into its substantially vertical position to complete the deburring process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tool for shaving burrs and rough portions from a hole edge of a borehole formed through a workpiece while preventing substantially any chamfer to the hole edge of the borehole, the tool comprising:

a shaft having a first axis;

a cutter pivotally mounted on the shaft to rotate about a second axis substantially orthogonal to the first axis, the cutter having a cutting edge and a workpiece-engaging portion; and a mechanism to spring-load the cutter so that the cutter is normally held in a substantially vertical position and the cutter controllably rotates about the second axis from the substantially vertical position in a first direction upon engagement of the workpiece-engaging portion with the workpiece during movement of the cutter along the first axis wherein the workpiece-engaging portion substantially prevents the cutting edge from chamfering the hole edge and wherein during further movement of the cutter along the first axis in the borehole the cutter further controllably rotates about the second axis in the first direction to expose the cutting edge so that the cutting edge shaves burrs and rough portions from the hole edge of the borehole and wherein during still further movement of the cutter along the first axis in the borehole, the cutter still further controllably rotates about the second axis in the first direction until the cutter rotates into a retracted position within the shaft and wherein the mechanism includes at least one spring within the shaft for spring-loading the cutter along the first axis and wherein the mechanism further includes at least one pin for engaging the cutter within the shaft and wherein the at least one pin is spring-loaded by the at least one spring.

2. The tool as claimed in claim 1, wherein the cutter includes a head portion for engaging one end of the at least one pin in the retracted position.

3. A tool for shaving burrs and rough portions from first and second hole edges of a borehole formed completely through a workpiece between first and second surfaces thereof while preventing substantially any chamfer to the first and second hole edges of the borehole, the tool comprising:

a shaft having a first axis;

a cutter pivotally mounted on the shaft to rotate about a second axis substantially orthogonal to the first axis, the cutter having first and second cutting edges and first and second workpiece-engaging portions; and a mechanism to spring-load the cutter so that the cutter is normally held in a substantially vertical position and the cutter controllably rotates about the second axis from the substantially vertical position in a first direction upon engagement of the first workpiece-engaging portion with the first surface of the workpiece during movement of the cutter along the first axis wherein the first workpiece-engaging portion substantially prevents the first cutting edge from chamfering the first hole edge and wherein during further movement of the cutter along the first axis in the borehole the cutter further controllably rotates about the second axis in the first direction to expose the first cutting edge so that the first cutting edge shaves burrs and rough portions from the first hole edge of the borehole and wherein during still further movement of the cutter along the first axis in the borehole, the cutter still further controllably rotates about the second axis in the first direction until the cutter rotates into a first retracted position within the shaft to allow the cutter to completely pass through the borehole and wherein the mechanism further spring-loads the cutter so that the cutter controllably rotates about the second axis from the substantially vertical position in a second direction opposite the first direction upon engagement of the second workpiece-engaging portion with the second surface of the workpiece during movement of the cutter along the first axis wherein the second workpiece-engaging portion substantially prevents the second cutting edge from chamfering the second hole edge and wherein during further movement of the cutter along the first axis wherein the second workpiece-engaging portion substantially prevents the second cutting edge from chamfering the second hole edge and wherein during further movement of the cutter along the first axis in the borehole the cutter further controllably rotates about the second axis in the second direction to expose the second cutting edge so that the second cutting edge shaves burrs and rough portions from the second hole edge of the borehole and wherein during still further movement of the cutter along the first axis in the borehole, the cutter still further controllably rotates about the second axis in the second direction until the cutter rotates into a second retracted position within the shaft to allow the cutter to completely pass through the borehole again and wherein the mechanism includes first and second springs within the shaft for spring-loading the cutter in opposite direction along the first axis and wherein the mechanism further includes first and second pins for engaging the cutter within the shaft and wherein the first and second pins are spring-loaded by the first and second springs, respectively.

4. A tool for shaving burrs and rough portions from a hole edge of a borehole formed through a workpiece while preventing substantially any chamfer to the hole edge of the borehole, the tool comprising:

a shaft having a first axis;

a cutter pivotally mounted on the shaft to rotate about a second axis substantially orthogonal to the first axis, the cutter having a cutting edge and a workpiece-engaging portion; and a mechanism to spring-load the cutter so that the cutter is normally held in a substantially vertical position and the cutter controllably rotates about the second axis from the substantially vertical position in a first direction upon engagement of the workpiece-engaging portion with the workpiece during movement of the cutter along the first axis wherein the workpiece-engaging portion substantially prevents the cutting edge from chamfering the hole edge and wherein during further movement of the cutter along the first axis in the borehole the cutter further controllably rotates about the second axis in the first direction to expose the cutting edge at an angle of approximately 50° from the substantially vertical position so that the cutting edge shaves burrs and rough portions from the hole edge of the borehole and wherein during still further movement of the cutter along the first axis in the borehole, the cutter still further controllably rotates about the second axis in the first direction until the cutter rotates into a retracted position within the shaft.

5. The tool as claimed in claim 4, wherein the mechanism includes at least one spring within the shaft for spring-loading the cutter along the first axis.

6. The tool as claimed in claim 5, wherein the mechanism further includes at least one pin for engaging the cutter within the shaft and wherein the at least one pin is spring-loaded by the at least one spring.

7. The tool as claimed in claim 6, wherein the cutter includes a head portion for engaging one end of the at least one pin in the retracted position.

8. A tool for shaving burrs and rough portions from first and second hole edges of a borehole formed completely through a workpiece between first and second surfaces thereof while preventing substantially any chamfer to the first and second hole edges of the borehole, the tool comprising:

a shaft having a first axis;

a cutter pivotally mounted on the shaft to rotate about a second axis substantially orthogonal to the first axis, the cutter having first and second cutting edges and first and second workpiece-engaging portions; and a mechanism to spring-load the cutter so that the cutter is normally held in a substantially vertical position and the cutter controllably rotates about the second axis from the substantially vertical position in a first direction upon engagement of the first workpiece-engaging portion with the first surface of the workpiece during movement of the cutter along the first axis wherein the first workpiece-engaging portion substantially prevents the first cutting edge from chamfering the first hole edge and wherein during further movement of the cutter along the first axis in the borehole the cutter further controllably rotates about the second axis in the first direction to expose the first cutting edge at an angle of approximately 50° from the substantially vertical position so that the first cutting edge shaves burrs and rough portions from the first hole edge of the borehole and wherein during still further movement of the cutter along the first axis in the borehole, the cutter still further controllably rotates about the second axis in the first direction until the cutter rotates into a first retracted position within the shaft to allow the cutter to completely pass through the borehole and wherein the mechanism further spring-loads the cutter so that the cutter controllably rotates about the second axis from the substantially vertical position in a second direction opposite the first direction upon engagement of the second workpiece-engaging portion with the second surface of the workpiece during movement of the cutter along the first axis wherein the second workpiece-engaging portion substantially prevents the second cutting edge from chamfering the second hole edge and wherein during further movement of the cutter along the first axis in the borehole the cutter further controllably rotates about the second axis in the second direction to expose the second cutting edge at an angle of approximately 50° from the substantially vertical position so that the second cutting edge shaves burrs and rough portions from the second hole edge of the borehole and wherein during still further movement of the cutter along the first axis in the borehole, the cutter still further controllably rotates about the second axis in the second direction until the cutter rotates into a second retracted position within the shaft to allow the cutter to completely pass through the borehole again.

9. The tool as claimed in claim 8, wherein the mechanism includes first and second springs within the shaft for spring-loading the cutter in opposite direction along the first axis.

10. The tool as claimed in claim 9, wherein the mechanism further includes first and second pins for engaging the cutter within the shaft and wherein the first and second pins are spring-loaded by the first and second springs, respectively.

11. The tool as claimed in claim 10, wherein the cutter includes a head portion for engaging an end of one of the pins in each of the retracted positions.

12. The tool as claimed in claim 3, wherein the cutter includes a head portion for engaging an end of one of the pins in each of the retracted positions.

* * * * *